United States Patent Office 3,066,999
Patented Dec. 4, 1962

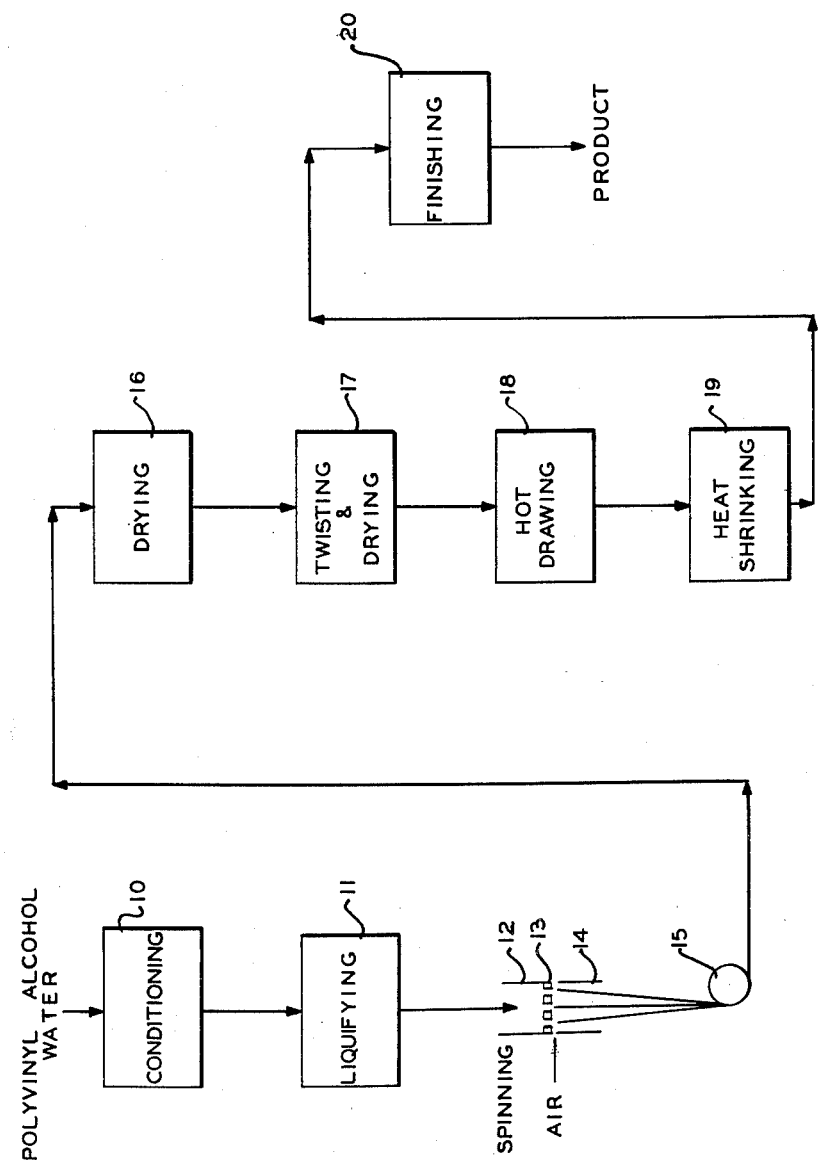

3,066,999
POLYVINYL ALCOHOL FIBER AND METHOD
OF MAKING THE SAME
Shogo Nakajo, Nishinomiya City, and Eiichi Morita, Okayama City, Japan, assignors of three-fourths to Kurashiki Rayon Co., Ltd., Kurashiki-shi, Japan, a corporation of Japan, and one-fourth to Air Reduction Company, Incorporated, New York, N.Y., a corporation of New York
Filed June 9, 1959, Ser. No. 819,116
Claims priority, application Japan Aug. 19, 1958
6 Claims. (Cl. 18—54)

This invention relates to improved polyvinyl alcohol fibers and to the manufacture of such improved fibers.

Polyvinyl alcohol fibers are usually prepared by extruding a dilute solution of polyvinyl alcohol into an aqueous coagulating bath which contains a coagulating salt such as sodium sulfate. Fibers so produced are usually subjected to various after treatments including stretching and acetalization to improve desired properties of the fibers. However, such prior processes have certain disadvantages. For example, the use of a coagulating salt introduces the problem of removing the salt from the fiber. Additionally, the salt tends to cause abrasion or breakage of filaments during various process steps. Also, fibers prepared by such prior processes have characteristics which make them unsuitable for many uses.

It has further been suggested that polyvinyl alcohol fibers be prepared by extruding a dilute solution of polyvinyl alcohol into a gaseous drying medium such as air thereby to form filaments. However, such processes have not been widely adopted in view of the difficulties inherent in drying the dilute polyvinyl alcohol solutions to form filaments.

It has additionally been proposed to extrude more concentrated polyvinyl alcohol to form filaments. However, such prior proposals have not been successful for the production of relatively fine denier filaments having high strength and other superior properties.

It is an object of the present invention to provide an improved polyvinyl alcohol fiber.

It is a further object of the invention to provide a method for preparing an improved polyvinyl alcohol fiber.

It is a particular object of the invention to provide a polyvinyl alcohol fiber having properties of high strength and fatigue resistance which make the fiber very useful as a tire cord.

Other objects of the invention will be apparent from the description given in the following specification and claims.

In accordance with the present invention, highly concentrated polyvinyl alcohol is extruded through very small holes in a spinning jet into a medium effective to cause rapid congealing or solidification of the extruded concentrated polyvinyl alcohol in a semi-melt type spinning operation.

The resulting solidified concentrated polyvinyl alcohol is then dried to remove water associated with the polyvinyl alcohol during spinning. It is an important feature of the invention that during drying of the polyvinyl alcohol elongation or stretching is suppressed while the polyvinyl alcohol contains substantial quantities of water.

After drying, the resulting polyvinyl alcohol filaments are heated to elevated temperatures and stretched rapidly and uniformly to a length many times their original length. Subsequently, these stretched filaments are subjected to further treatment at elevated temperatures during which slight shrinkage takes place.

After washing and treatment with a finishing agent, and then drying, filaments having outstanding properties are obtained. The filaments are substantially circular in cross-sectional configuration and have no distinct skin and core sections. The filaments have good dyeability. The strength, both dry and wet, of the filaments is excellent as is the flex strength. The wet heat resistance is excellent without chemical modification. A particularly outstanding property of the filaments of the invention is the high fatigue resistance thereof.

The drawing which accompanies the present specification and claims illustrates in diagrammatic form practice of the invention.

Polyvinyl alcohol which is used in this invention is linear synthetic hydroxylated material having the hydroxyl groups attached directly to carbon atoms which form part of the polymer chain. The polyvinyl alcohol used herein consists of at least 98% vinyl alcohol units,

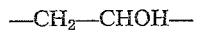

and preferably consists essentially of polyvinyl alcohol units. Preferably the spread in molecular weight of the polyvinyl alcohol used is very small.

The polyvinyl alcohol starting material for use in the invention has a degree of polymerization of at least about 800 and preferably above about 1200. Generally, the degree of polymerization is below about 3000 although polyvinyl alcohol having a higher degree of polymerization can be used. Suitably, the polyvinyl alcohol is prepared by polymerizing a vinyl ester such as vinyl acetate. The polymeric vinyl ester is then subjected to treatment such as alkali-catalyzed alcoholysis whereby the ester groups are replaced by hydroxyl groups to produce polyvinyl alcohol. It is preferred in this invention to employ polyvinyl alcohol having a very narrow range of distribution of degree of polymerization. Such polyvinyl alcohol can be prepared by the partial polymerization of vinyl acetate followed by alcoholysis of the polymerized vinyl acetate. Prior to use in the preparation of fibers the polyvinyl alcohol is treated, for example, by washing, to remove as much of the impurities normally associated therewith as is readily possible.

Referring now to the accompanying drawing, the polyvinyl alcohol charge is conditioned in zone 10 preparatory to liquefying and subsequent spinning. It is an important aspect of the present invention that the polyvinyl alcohol and water be thoroughly mixed and conditioned prior to liquefaction and spinning in order to avoid process difficulties and to insure product uniformity. It is additionally important prior to liquefaction, especially where an extruder is used in the liquefaction, to increase the bulk density of the polyvinyl alcohol and water mixture to as high a value as is conveniently possible.

Polyvinyl alcohol as normally produced is somewhat spongy and of low apparent density, e.g. 0.25–0.3 g./cc. If such polyvinyl alcohol is admixed with water and liquefied in an extruder at 130° C. and 50 kg./cm.² pressure, 100 g. of the liquefied mixture will normally contain 24.1 cc. air. If such a mixture is subsequently spun, there are considerable filament breakage and air bubble problems as well as product uniformity problems.

In accordance with a practice of the invention, water and polyvinyl alcohol are admixed in desired proportions and then heated and kneaded at temperatures ranging from about 50–85° C. to a fused semi-molten state. The kneading is carried out in a conventional kneader or in a heavy bladed mixer such as a sigma bladed mixer. After thorough kneading, the fused particles are crushed or shredded to a fine average particle size, e.g. 4 mm. diameter, before being introduced into the extruder. The polyvinyl alcohol charge prepared in this way contains much less air and generally has a considerably higher bulk density.

The following table shows the effect of the kneading and conditioning on the apparent density of the crushed particles and on the air content of the liquefied mixture:

*Table 1*

| Polyvinyl alcohol treatment | Polyvinyl alcohol concentration weight, percent | Apparent density, g./cc. | Air content of liquefied mixture, cc./100 g. |
|---|---|---|---|
| No kneading | 40 | 0.29 | 12.0 |
| Do | 45 | 0.29 | 12.0 |
| Do | 50 | 0.27 | 3.7 |
| Kneaded at 50° C | 44 | 0.26 | 1.06 |
| Kneaded at 67° C | 43 | 0.43 | 1.20 |
| Compressed in screw extruder at 130° C | 43 | 0.43 | 1.00 |

In place of the kneader, the mixture of polyvinyl alcohol and water can be conditioned in a screw extruder at elevated temperatures, e.g. 130° C. to form a fused product which can be crushed to fine particles and subsequently employed as charge to screw extruder liquefier.

The polyvinyl alcohol concentration by weight of the mixture leaving the conditioning zone 10 can vary depending upon several considerations as will be described in detail hereinafter in connection with the spinning operation.

Prior to or during the conditioning it as usually desirable to add to the polyvinyl alcohol certain materials in order to improve the characteristics of the fibers produced by the invention and/or the ease with which the invention is carried out. During mixing and conditioning these materials are uniformly and evenly distributed throughout the mixture of polyvinyl alcohol and water.

Polyvinyl alcohol which is used in the invention is frequently prepared from polymerized vinyl ester by processes involving the use of alkaline materials such as sodium hydroxide or sodium methylate. The polyvinyl alcohol prepared in this way generally contains minor quantities of alkaline material even after thorough washing. The presence of such alkaline material promotes discoloration of the polyvinyl alcohol during the process for preparing the fibers and after the fibers have been formed, especially at elevated temperatures.

In accordance with practice of this invention when polyvinyl alcohol containing alkaline impurities is employed as charge material, a small amount of an acidic salt, i.e. the salt of a strong acid and weak base is added to the polyvinyl alcohol to improve the stability thereof. Magnesium sulfate has been found to be especially useful for this purpose. Zinc sulfate is also useful and preferred. Other suitable salts include ammonium sulfate, ammonium chloride, magnesium chloride, zinc chloride, aluminum sulfate, and the like. The salt is added preferably in amount in excess of that needed to react with and neutralize the alkaline impurity, for example, in amount up to about twice that needed to neutralize the impurity. Very large excesses should be avoided since the presence of excessive amounts of the salt of a strong acid and a weak base also promotes degradation of the polyvinyl alcohol and causes product turbidity as well as spinning difficulty. The salt such as magnesium sulfate is added to the polyvinyl alcohol preferably prior to mixing and conditioning, and is uniformly incorporated throughout the mixture of polyvinyl alcohol and water during these subsequent operations.

The conditioned mixture of polyvinyl alcohol and water, which is in the form of elastic, small particles, is transported to zone 11 wherein the mixture is liquefied. Since the fibers of this invention are formed by extrusion of a mobile liquid, an important consideration in determining a suitable concentration of polyvinyl alcohol in the mixture from the conditioning zone is the ease and speed with which the mixture can be liquefied. The ease with which the polyvinyl alcohol mixture is liquefied depends both upon the water content and upon the degree of polymerization of the polyvinyl alcohol. Generally, polyvinyl alcohol having a higher degree of polymerization is more difficult to liquefy for a given water concentration. Additionally, the higher the water content of the conditioned mixture the more readily the mixture is liquefied.

The conditioned mixtures employed in the present invention cannot be readily liquefied by the application of heat alone. Usually, substantial decomposition of the polyvinyl alcohol takes place at the elevated temperatures necessary for liquefaction. In accordance with the instant invention, in zone 11 the mixture of polyvinyl alcohol and water is liquefied by the application of heat and pressure. Through the use of pressure, the conditioned mixtures can be liquefied at moderately elevated temperatures, e.g., in the range of 110° C.–160° C.

In an especially preferred practice of the invention, liquefaction zone 11 comprises a screw type extruder capable of developing pressures of the order of 20–100 kg./cm.$^2$ and higher, and which is equipped with heating means. The conditioned mixture from zone 10 in the form of fine uniform particles having high bulk density is fed at a continuous rate to the extruder. In the extruder the mixture is heated and compressed whereupon liquefaction of the polyvinyl alcohol-water mixture takes place. It is important in this embodiment of the invention to insure that the charge mixture has high bulk density. Use of a high bulk density charge minimizes the amount of air which is contained with the charge mixture and lessens the amount of air dissolved or dispersed during liquefaction and consequent bubble formation during spinning. High bulk density feed also increases throughput rate for a given extruder.

In accordance with the preferred embodiment of the invention wherein an extruder is employed in the liquefaction, it has been discovered that it is necessary to obtain high throughput rates through the extruder to incorporate a special material in the mixture of polyvinyl alcohol and water. At high throughput rates in an extruder, there is a tendency for metal to metal friction to cause overheating and product darkening. While we do not wish to be bound by a particular theory, it is believed that the overheating is caused by heat developed as a result of high friction between the screw and liner of the extruder.

Now it has been found that scorching or charring of the polyvinyl alcohol can be avoided even at high concentrations of polyvinyl alcohol and high extruder throughput rates by the addition of very small amounts of a lubricant type material to the extruder charge mixture. The additive should be compatible with the polyvinyl alcohol and have no deleterious effect on subsequent process steps or on properties of the product fibers. Especially preferred additives include polyoxyethylene lauryl sulfate, lauryl trimethyl ammonium chloride and polyoxyethylene sorbitan monostearate. However, other additives which are effective to reduce the friction between the polyvinyl alcohol and the extruder surfaces can also be used. Examples of other additives are oils, waxes, fatty acids, salts or esters of fatty acds and the like.

The lubricant-type additives are employed in effective amount to suppress scorching or charring of polyvinyl alcohol. Generally, at least about 0.05% by weight of polyvinyl alcohol is used. About 0.1% is generally suitable in most cases, while above about 0.15% no additional improved effect is generally discernible.

Besides reducing the tendency of the polyvinyl alcohol to scorch or char during extrusion, the use of the above additives has the additional advantage that more ready and uniform liquefaction of the polyvinyl alcohol and water takes place in the extruder when the above additives are used. Uniformity of product from the extruder is thereby improved.

The mixture of polyvinyl alcohol and water supplied into the entrance opening of the extruder is delivered directly to the cylindrical barrel and compressed and heated to liquefaction by the screw. The temperature of the conditioned polyvinyl alcohol-water mixture entering the extruder is maintained at about 90° C. or less and preferably at 60° C. or less. At temperatures above about 90° C. the charge material tends to adhere to metal surfaces and does not move forward. This in turn permits flow-back of water vapor from the liquefied mixture further along in the extruder causing undesirable variations in composition and delivery of the spinning liquid. Preferably the charge mixture temperature is 40° C. or more since at lower temperatures there is a tendency for water to be physically separated from the polyvinyl alcohol by squeezing.

Temperatures of about 110° C.–160° C. and pressures of about 20–100 kg./cm.$^2$ are most useful in the portion of the extruder wherein the polyvinyl alcohol-water mixture is liquefied. Residence time in the extruder can vary widely. Illustrative suitable residence time is 30 seconds.

Although in the preferred practice of the invention a screw-type extruder is employed in the liquefaction, other apparatus suitable for liquefying a mixture of polyvinyl alcohol and water by the application of heat and pressure can be employed.

The liquefied extrudate is passed from zone 11 to spinneret 12. Usually the extrudate is filtered (not shown) one or more times in order to remove foreign material which might otherwise plug holes in the spinning jet. A metering pump (not shown) is preferably provided in order to insure constant delivery rate of extrudate to the spinning zone.

In spinneret 12 the temperature of the extrudate is adjusted to a suitable spinning temperature, and the liquid is then extruded through small holes in spinning jet 13 into zone 14 wherein congealing or solidification takes place. Successful practice of the instant invention requires careful regulation of the conditions of spinning and congealing in order to obtain fibers having superior properties.

The spinning method of the present invention is best described as a semi-melt type spinning. The polyvinyl alcohol contains sufficient water to enable the mixture to be liquefied readily to produce a mobile liquid which can be extruded without great difficulty through fine holes in the spinning jet. On the other hand, the water content should be sufficiently small such that after passing through the fine spinning holes the resultant viscous material congeals rapidly even without high rates of evaporation of the contained water.

Three very important factors to be considered in the successful spinning are the concentration of polyvinyl alcohol in the liquid from extruder 11, the temperature at which this liquid is extruded through the fine holes in the spinning jet, and the size of the spinning holes. Each of these three factors will be taken up in some detail in the following description.

High concentrations of polyvinyl alcohol are necessary to insure rapid solidification of the spun liquid. At the same time, the polyvinyl alcohol concentration should not be too high so as to cause liquefaction or spinning difficulty. Usually a polyvinyl alcohol concentration in the range of about 30–65% by weight is suitable. The degree of polymerization of the polyvinyl alcohol is an important factor to be considered in determining proper concentration since the degree of polymerization has a great effect on viscosity of the resulting liquid. The higher the degree of polymerization, the lower the concentration of polyvinyl alcohol required for a particular viscosity. Generally, in practice of the invention, spinning mixtures having a viscosity of the order of about 4000–6000 poises at 90° C. are suitable. With polyvinyl alcohol having a degree of polymerization of about 800–1200, high polyvinyl alcohol concentrations, e.g. 55–65% are employed. Intermediate 1200–2000 degree of polymerization polyvinyl alcohol is suitably used in concentrations of about 40–55%. High degree of polymerization polyvinyl alcohol, 2000–3000, is used in concentrations of about 30–40%.

The temperature at which the mixture is spun should be high enough so that the mixture is fluid and can be pumped and extruded. However, the temperature should not be so high as to cause product degradation. In addition, the temperature should be such that the polyvinyl alcohol solidifies rapidly after passing through the spinning jet without the formation of vapor bubbles in the filaments. In practice of the invention the temperature of the polyvinyl alcohol in the spinneret just prior to extrusion through the spinning holes should be at least 100° C. and is preferably 120° C. or above.

The spinning jet hole size also is important in the invention. Relatively small hole sizes are needed in order to produce fine denier filaments by the invention. In addition, spinning jet hole size is important insofar as avoiding bubble formation in the filaments. For a given concentration of polyvinyl alcohol, higher temperatures of spinning can be employed without problems of bubble formation in the filaments the smaller the size of the spinning jet holes. In carrying out preferred practice of the invention, spinning jet hole sizes of 0.3 mm. diameter or smaller and spinning temperatures of 120° C. and above are employed.

It is an important feature of this invention that filaments are produced which are free of bubbles therein without the necessity of costly and elaborate deaeration techniques. By employing high bulk density polyvinyl alcohol and water mixtures so as to minimize the amount of air dissolved in the polyvinyl alcohol extrudate, by using highly concentrated polyvinyl alcohol in the spinning, and by extruding the concentrated polyvinyl alcohol through very small spinning jet holes and quickly congealing the extruded material, bubble formation in the filaments is avoided even though high spinning temperatures are employed.

After passing through the spinning jet holes, the mixture of polyvinyl alcohol and water is rapidly cooled in zone 14. In preferred practice air at about 50° C. is introduced cocurrent with the direction of the extruded polyvinyl alcohol near the underside of the spinning jet. A small amount of the water contained with the polyvinyl alcohol vaporizes thus aiding in the cooling and congealing of the polyvinyl alcohol.

In a preferred embodiment of the invention, an inert, powdered material such as anhydrous sodium sulfate, titanium dioxide, diatomaceous earth, talc, silica gel, or the like is introduced into zone 14. This material effectively coats the extruded filaments and suppresses any tendency of the filaments to adhere to each other.

The inert powdered material can be employed in amounts of 10% or less based on the weight of the filaments and adhesion of filaments to each other is effectively suppressed. Larger amounts can be employed if desired. The inert powdered material can be inorganic or organic and preferably does not react with polyvinyl alcohol. The powdered material is preferably readily removable as by washing from the filaments. Anhydrous salts which absorb water are especially useful since they tend to promote dehydration and solidification of the filaments.

Preferably the finely powered material is admixed with the air or other gaseous medium prior to the introduction thereof into zone 14. However, the powder can be dropped or scattered directly in zone 14.

In place of air, other inert fluid media can be employed to effect cooling and congealing of the polyvinyl alcohol. Although a temperature of about 50° C. is preferred, this temperature can vary considerably. Other gases such as nitrogen can be employed. Inert liquid media such as mineral oil, chlorinated hydrocarbons, and the like can be employed.

The congealed filaments comprising water and polyvinyl alcohol are passed through zone 14 and around take-up roll 15. Operation of the process is regulated such that the draft ratio of the extruded material is in the range of about 0.3 to 1.0 and preferably about 0.4 to 0.7. Draft ratio as used in the instant specification and claims is defined as the ratio of $V_2$, the velocity of the filaments travelling around the take-up roll, divided by $V_1$, the calculated extrusion velocity of the polyvinyl alcohol and water through the spinning jet holes, based on the volume of the extruded liquid and the area of the spinning jet holes. Thus, at a draft ratio of less than 1, the congealed filaments are moving at a slower velocity than that at which the liquid was extruded through the spinning jet holes.

It has been found, in accordance with the invention, that low draft ratios are important in order that optimum product properties are obtained. For example, at lower draft ratios resulting filaments can be hot drawn to greater lengths with resulting improved properties. Usually the take-up roll is located as close to the spinning jet as is practical in order to facilitate operation at the low draft ratios.

The coagulated filaments passing around the take-up roll 15 contain high percentages of water, for example, up to 100% or more based on the weight of polyvinyl alcohol. Prior to subsequent heat treatment it is necessary to thoroughly dry these filaments. Accordingly, the filaments are passed to zone 16 wherein they are dried.

It is an extremely important part of this invention that during drying of the filaments, while the filaments contain substantial quantities of water, stretching of the filaments is minimized. It has been found that stretching of the filaments while the filaments are in the semi-coagulated state, i.e. the filaments contain about 10% or more of water, deleteriously affects the properties of the filaments such as hot drawability and water resistance.

In view of the high water content of the congealed filaments entering zone 16, it is desirable to carry out the drying at gradually increasing temperatures in one or more drying zones. Lower temperatures of the order of about 100° C. are preferred initially to prevent melting or sticking of the filaments. As the water content is reduced, the drying temperature is increased to about 150–190° C. to complete the drying.

The strength of filaments prepared by this invention is dependent on the amount the filament is hot-stretched. The amount filaments can be stretched in turn depends upon the treatment given the filaments prior to hot-stretching.

In accordance with this invention, we have found that the dry tenacity of the filaments before heat stretching should be 1.5 grams per denier or less, and preferably less than 1.4 grams per denier, e.g., 1.25–1.35 g./d. in order that the filaments can be stretched to give products having maximum strength. The above-described process conditions of low draft during spinning and suppression of stretching during the drying of the filaments to less than 10% water content result in the production of filaments having a strength or dry tenacity of less than 1.5 grams/denier prior to hot-stretching.

After drying, the filaments of the invention are subjected to treatment at elevated temperatures in order to obtain filaments having very high strength and other desirable properties. The heat treatment includes both hot drawing and further treatment at elevated temperature whereby usually slight shrinkage takes place.

Prior to heat treatment, the filaments are preferably twisted about 50–120 turns per meter, preferably about 80 turns per meter. Such twisting is distinctly advantageous in that the twisted filaments can be drawn to higher draw ratios without excessive filament breakage. The twisting takes place in zone 17.

After twisting, the filaments are preferably further dried in zone 17 to bone dry prior to hot drawing. Complete or substantially complete water removal prior to hot drawing is important in order to avoid excessive filament breakage. Preferred drying temperatures are in the range of about 160–180° C.

After the above treatment, the filaments are hot drawn in zone 18 at temperatures in the range of about 210° C. to below the melting point to a length in the range of 5 to 15 times and preferably 8 to 11 times the original undrawn length. This hot drawing is necessary to improve the strength and water resistance of the filaments and to lessen the creep elongation thereof. Also the hot drawing makes possible the production of fine denier filaments.

The hot drawing can be carried out in any suitable heating medium such as air, nitrogen, and the like. However, in accordance with a preferred embodiment of the invention, the hot drawing is carried out in a bath of molten metal such as Wood's metal. The use of such a molten metal bath has outstanding advantages in that the time necessary for the hot drawing is reduced to a fraction of that required by other methods. Thus, the possibility of product degradation resulting from long times at high temperatures is minimized. Small, more compact heat treating equipment can be employed. More uniform hot drawing is obtained.

Through the use of molten metal baths, times required for hot drawing the filaments range from about 3 to 10 seconds while with other media such as air longer times such as about 15–50 seconds are required for hot drawing. Less desirably, in place of molten metal baths, baths of other inert materials such as hydrocarbons, chlorinated hydrocarbons, eutectic salts, and the like can be used.

When employing molten metal baths, it is desirable to precoat the fibers which are to be treated therein with a protective coating agent in accordance with the invention described in copending Kawai et al, application Serial No. 738,616, filed May 29, 1958. The use of such coating agents prevents staining or other damage to the filaments. Polyalkylene glycols, for example, polyethylene glycol and polypropylene glycol are illustrative of suitable coating materials.

It is desirable in practice of the invention that the hot drawing be carried out in one step rather than in a plurality of separate drawing steps. One step hot drawing gives a more uniform product having superior properties and is a substantially simpler operation. However, the hot drawing may be carried out in a plurality of steps.

In an improtant and novel practice of the invention, the hot drawing step is carried out in a zone having several different temperatures. The initial temperature is maintained at a relatively lower level, e.g. 210° C., while the temperature is substantially increased in one or preferably a plurality of increments to a relatively high exit temperature, e.g. 235° C. We have made the surprising discovery that the hot drawability of polyvinyl alcohol filaments is substantially improved by this type of operation as contrasted with treatment in a zone having a substantially uniform temperature. It is preferred that the temperature of the hot drawing zone be continuously increased throughout, although alternatively the zone may be divided into several sub-zones maintained at progressively higher temperatures.

At inlet temperatures very much below 210° C., uneven heating and drawing tend to occur. At high inlet temperatures, e.g. 230° C., filament melting and breakage tend to take place. Preferred operation comprises inlet temperatures of 210–220° C. and outlet temperatures of zone 18 of 230–235° C. with one or more intermediate temperature zones.

After hot drawing, the filaments are passed to zone 19 wherein the filaments are heated to elevated temperatures under conditions of constant length or more preferably under conditions such that slight shrinkage takes place. The heating medium is preferably a molten metal bath such as used in the hot drawing step. Other media such as air and the like, as described above in connection with the hot drawing, can also be used.

The heat treatment temperature in zone 19 is preferably in the range of about 215–250° C. The time of heat treatment using a metal bath is generally of the order of 5–30 seconds. Longer times are required when media such as air are employed. The heat shrinkage can be carried out in several steps, for example, the filaments can be first heated under conditions such that slight shrinkage takes place, and subsequently further heated at constant length.

In preferred practice of the invention, the temperature of the heat treating zone 19 is varied in a manner somewhat similar to that described above for zone 18. We have found that filament breakage and other filament properties are greatly improved when the initial temperature of zone 19 is maintained at a somewhat lower level, e.g. 220–225° C., and the temperature is gradually increased in one or more steps to an exit temperature of about 235° C.

It will be apparent to those skilled in the art that the novel heat drawing and heat treating of polyvinyl alcohol fibers in zones having increasing temperature as above described is applicable to fibers prepared by spinning techniques other than the semi-melt method described herein.

The heat treatment improves the water resistance and fatigue resistance as well as the elongation of the filaments. However, the heat treatment has the effect of increasing the creep of the product filaments and where the filaments are to be used in tire cord shrinkage should be kept fairly low, e.g. 10% or less. Greater shrinkage, e.g. 20%, is suitable where the filaments are contemplated for use in other applications.

After heat treatment, the filaments may be washed (not shown) and then treated with a finishing agent. We have found that the particular finishing agent which is employed has an important effect on such properties of the filaments as fatigue resistance. We have found that Nopco 2169M, which comprises a mixture of an alkyl benzene sulfonate and paraffin imparts especially desirable fatigue resistance characteristics to the filaments. Other finishing agents which can be employed include sorbitan monopalmitate and the ethylene oxide adduct of hydrogenated castor oil. The finishing agents are generally employed in amounts of about 0.5% to 2.0% and preferably about 1.0% by weight of the polyvinyl alcohol.

After treatment in zone 20, the filaments are dried (not shown) thereby to produce the novel filaments of this invention. The instant novel filaments are characterized by an outstanding tensile strength for a given monofilament size as contrasted with prior art filaments. The filaments are substantially round, and have a homogenous cross-section without distinct skin and core regions. The filaments have excellent wet strength and very good wet heat resistance. The filaments are resistant to boiling water even after long immersion without additional chemical treatment. An outstanding property of the filaments is their high flex strength and fatigue resistance which property coupled with other properties of the filaments enables them to be successfully used as tire cords. In addition to the above, the filaments have fairly low coefficients of friction, high abrasion resistance and very good dyeability characteristics. By practice of this invention it is possible to obtain monofilament deniers as low as about 3.

An outstanding feature of the present invention is that both relatively fine and relatively coarse denier filaments having high strength can be prepared thereby. This is contrasted with wet spinning techniques wherein product filament strength decreases greatly with increasing monofilament denier.

The improved polyvinyl alcohol fibers prepared by this invention find special utility in the production of tire cords. When the fibers are used to make tire cords, it is desirable and advantageous to subject the tire cords to various heat treatment steps as will be more fully described subsequently in connection with certain working examples.

The following examples illustrate the invention:

EXAMPLE 1

Polyvinyl alcohol having a degree of polymerization of about 1700 and which was prepared from polyvinyl acetate resulting from the partial polymerization of vinyl acetate, was thoroughly washed with water to remove impurities therefrom. The washed material was squeezed between rolls to remove excess water and was thoroughly mixed in a sigma bladed mixer to insure a uniform composition. During mixing about 0.2% of magnesium sulfate and 0.1% of lauryl trimethyl ammonium chloride based on the weight of polyvinyl alcohol were added to the washed polyvinyl alcohol.

After thorough mixing, the resulting material was shredded to an average particle size of about 4 mm. diameter. The shredded material was then conditioned in a sigma bladed mixer to form a mixture comprising about 43% by weight polyvinyl alcohol and 57% water. The conditioning was carried out at 95° C. During mixing and conditioning the bulk density of the polyvinyl alcohol and water mixture increased considerably.

After thorough conditioning, the resulting particles were sent to a screw-type extruder wherein the particles were liquefied by the application of heat and pressure. The liquid extrudate from the extruder was at a temperature of about 130° C. and a pressure of about 50 kg./cm.$^2$. The liquid extrudate was passed through several candle filters in order to insure complete removal of solid foreign matter. The temperature of the extrudate was adjusted to 125° C. and the extrudate was extruded downwardly through a spinning jet having 200 holes each 0.1 mm. in diameter. Calculated velocity of the liquid through the holes was 52.5 meters per minute.

Air at about 50° C. was introduced into the spinning zone just beneath the underside of the spinning jet at a rate of about 140 liters per minute. The air travelled downwardly through the spinning zone cocurrent with the filaments. After travelling 1.36 meters, the filaments were passed around a take-up roll. At this point the fibers contained about 100% water based on the weight of polyvinyl alcohol. Draft ratio was 0.54. The filaments were dried in drying zones having temperatures respectively of 103° C., 140° C., and 160° C. During drying, 17% elongation of the filaments occurred.

The filaments were twisted about 80 turns per meter and then dried to bone dry at a temperature of 180° C. After drying, the filaments were stretched in a molten bath of Wood's metal maintained at 233° C. to 9.5 times their original length in 4.5 seconds. After hot drawing, the filaments were passed to a second Wood's metal bath at 235° C. wherein the filaments underwent 5% shrinkage in 7.5 seconds. After washing, finishing and drying, the product fiber had the following properties:

| | |
|---|---|
| Yarn denier | 1200 |
| Number of fils | 200 |
| Dry tenacity, g./d | 7.5 |
| Wet tenacity, g./d | 5.97 |
| Dry elongation_____percent | 9.3 |
| Wet elongation_____do | 11.9 |
| Moisture absorption_____do | 2.78 |
| Shrinkage 30 min. in 100° C. water_____do | 6.3 |
| Ratio of wet tenacity to dry tenacity | 78.9 |
| Finishing agent absorption_____percent | 1.00 |
| Young's modulus_____percent kg./mm.$^2$ | 244 |
| Coefficient of circular approximation____percent | 80.7 |

EXAMPLE 2

The example illustrates practice of the invention wherein the mixture to be spun is first conditioned in a kneader.

A mixture of 40 parts of polyvinyl alcohol having an average degree of polymerization of 1710 and 60 parts of water was kneaded for 30 minutes at 70° C. in a kneader. The fused product was crushed into fine particles which were continuously liquefied in an extrusion machine having a compression ratio of 3.8.

The liquefied mixture was spun through a metal plate having 200 holes each of 0.1 mm. diameter at the rate of 0.4 cc./min. per hole. Extremely good results were obtained. The resulting filaments had no contained air.

EXAMPLE 3

This example illustrates practice of the invention wherein the mixture to be spun is first conditioned in a screw extruder.

A mixture of 50 parts of polyvinyl alcohol having an average degree of polymerization of 1600 and 50 parts of water were liquefied in a screw extruder which had a compression ratio of 4.0 under 30 kg./cm.$^2$ pressure and at 130° C. temperature. The solution was extruded through a metal plate having 20 holes each of 3.0 mm. diameter. The extruded mixture was chopped up and the polyvinyl alcohol content thereof adjusted to 43% by weight by the addition of water.

This mixture was charged to the same extruder and liquefied at 130° C. and 50 kg./cm.$^2$ pressure. The liquid mixture was spun through a spinneret having 200 holes each 0.1 mm. diameter. Excellent filaments containing very little air were obtained.

EXAMPLE 4

The example illustrates liquefaction of the polyvinyl alcohol-water charge mixture in a screw extruder.

A mixture of 55 parts by weight of polyvinyl alcohol having average degree of polymerization of 1700 and 45 parts of water was liquefied in a screw extruder having a 2.5 inch diameter screw. The temperature at the screw inlet was maintained at 45° C., and the extrusion speed was 500 g./min. The liquid thus obtained was extruded through a nozzle having 1 mm. diameter. Variation in delivery rate was only 0.8% of the measured value per minute.

EXAMPLE 5

A mixture of 43 parts by weight polyvinyl alcohol having an average degree of polymerization of 1700 and 57 parts of water was fed into a screw extruder having 4.5 inch screw diameter. This mixture was liquefied smoothly and uniformly, and delivered at the rate of 1310 cc./min. The inlet temperature was 35° C., temperature in the liquefying portion of extruder was 135° C., and the liquefying pressure was 30 kg./cm.$^2$.

EXAMPLE 6

This example illustrates the use of inert, finely powdered material during spinning to suppress adhesion of the filaments to each other.

A liquid polyvinyl alcohol and water mixture comprising 40% by weight polyvinyl alcohol having a degree of polymerization of 1750 was extruded through a spinneret having 0.1 mm. diameter holes spaced 2.4 mm. apart at 80 m./min. injection speed. Air heat to 50° C. was supplied to the spinning zone at a rate of 150 liters/min. Finely powdered anhydrous sodium sulfate was added with the air at the rate of 1 gram sodium sulfate per liter of air.

The sodium sulfate adhered uniformly to the surface of the filaments after spinning, and there was no adhesion of the filaments to the take-up roll. After drying and hot-stretching, the sodium sulfate was removed by washing with water. Splendid filaments which were not adhered to each other were obtained. The amount of sodium sulfate which had coated the filaments was 3.5% based on the filament weight.

EXAMPLE 7

The process described in Example 6 was repeated except that finely powdered titanium oxide was added instead of sodium sulfate. About 1.2 grams of titanium dioxide per liter of air was used.

After drying, there was no observed adhesion of filaments with each other or with the apparatus. After drying, the amount of titanium coating the filaments was 1.7% based on the filament weight. After hot-stretching, the filaments contained 0.2% titanium dioxide. The filaments were washed to remove the titanium dioxide. Filaments having splendid strength and which were not adhered to each other were obtained.

EXAMPLE 8

A liquid polyvinyl alcohol and water mixture comprising 38% by weight polyvinyl alcohol having a degree of polymerization of about 1750 was extruded through a spinneret having 500 holes of 0.08 mm. diameter spaced 2.14 mm. apart. Air at the rate of 280 liters/min. and containing 0.85 gram per liter of finely powdered silica gel was introduced to the spinning zone. No adhesion of the filaments to each other was observed. The resulting 500 filament tow was hot-stretched, acetalized and cut to short length. Staple fibers of good contact feeling were obtained.

EXAMPLE 9

This example illustrates the effect of spinning temperature, polyvinyl alcohol concentration, and spinning jet hole size on bubble-free spinning.

Polyvinyl alcohol having a degree of polymerization of 1750 was extruded in various concentrations through different size spinning jet holes at different temperatures. The maximum spinning temperature at which bubble-free operation could be attained was determined. In each case the liquid polyvinyl alcohol and water mixture was prepared under similar conditions. The following table shows the results obtained.

*Table 2*

| | Spinning hole diameter, mm. | Maximum temperature for bubble-free operation, ° C. | | |
|---|---|---|---|---|
| | | 46% polyvinyl alcohol | 40% polyvinyl alcohol | 37% polyvinyl alcohol |
| Constant throughput of 0.4 g./hole/min | 0.50 | 105 | 103 | 100 |
| Do | 0.30 | 120 | 115 | 110 |
| Do | 0.20 | 150 | 145 | 130 |
| Do | 0.10 | 155 | 150 | 145 |
| Do | 0.08 | | 165 | 180 |
| Constant throughput of 0.8 g./hole/min | 0.50 | 110 | 105 | 100 |
| Do | 0.30 | 140 | 130 | 120 |
| Do | 0.20 | 160 | 155 | 145 |
| Do | 0.10 | 190 | 175 | 170 |
| Do | 0.08 | 220 | 210 | 200 |
| Constant throughput of 1.0 g./hole/min | 0.50 | 115 | 110 | 105 |
| Do | 0.30 | 145 | 135 | 125 |
| Do | 0.20 | 175 | 165 | 150 |
| Do | 0.10 | 215 | 200 | 190 |
| Do | 0.08 | 230 | 220 | 215 |

These results show that for a given concentration polyvinyl alcohol higher temperatures can be employed with smaller size spinning jet holes. The results also show that for a given spinning jet hole size, higher spinning temperatures and higher throughputs can be employed with higher concentrations of polyvinyl alcohol.

EXAMPLE 10

Polyvinyl alcohol having a degree of polymerization of about 1700 was liquefied as described in Example 1. The liquid at 130° C. was extruded through a spinneret having 200 holes each 0.1 mm. in diameter. Air at 50° C. in amount of 140 liters per minute was supplied to the spinning zone. The spun filaments were wound up and dried in zones at 103° C., 140° C., and 160° C.

The following table shows the spinning and drying conditions and the strength of the filaments after drying:

*Table 3*

| Sample No | 2 | 1 | 3 | 8 | 1 | 4 | 6 | 1 | 5 | 7 |
|---|---|---|---|---|---|---|---|---|---|---|
| Extrusion rate, cc./min | 88 | 77 | 77 | 88 | 77 | 88 | 77 | 77 | 88 | 77 |
| Extrusion speed, m/min | 51.0 | 44.6 | 44.6 | 51.0 | 44.6 | 51.0 | 44.6 | 44.6 | 51.0 | 44.6 |
| Draft (winding speed/extrusion speed) | 0.39 | 0.58 | 0.85 | 0.59 | 0.58 | 0.59 | 0.59 | 0.58 | 0.59 | 0.59 |
| Stretch ratio before entering drier | 1.120 | 1.125 | 1.10 | 1.06 | 1.125 | 1.44 | 1.92 | 1.125 | 1.12 | 1.125 |
| Stretch ratio during drying at 103° C | 1.02 | 1.02 | 1.02 | 1.02 | 1.02 | 1.02 | 1.02 | 1.02 | 1.02 | 1.02 |
| Stretch ratio during drying at 140° C | 1.02 | 1.02 | 1.02 | 1.02 | 1.02 | 1.02 | 1.02 | 1.02 | 1.31 | 1.75 |
| Dry tenacity of dried filaments | 1.39 | 1.39 | 1.45 |  | 1.39 | 1.45 | 1.50 | 1.39 | 1.55 | 2.06 |

After drying, the filaments were twisted 80 turns per meter and dried to bone dry at 180° C. Part of each sample of the filaments was then hot-stretched in air at 233° C., and the maximum hot draw ratio for each sample was determined. Some filaments from each sample were stretched 70% of the maximum while others were stretched 0.5 times more than 70%; the stretching was in air at 233° C. The filaments were heat shrunk 5% in air at 255° C. and heat set at constant length at 240° C. The following table shows the filament properties:

Polyvinyl alcohol filaments, after spinning and drying in accordance with this invention, were twisted and subsequently hot drawn to a draw ratio of 9.5 under the same conditions. The filaments were then heat treated, washed, finished and dried and wound under the same conditions.

After winding, the packages each containing 2 lbs. of filaments were examined to determine the filament breakage visible from the outside. If more than 20 breaks were visible the package was deemed not satisfactory.

*Table 4*

| Sample No | 2 | | 1 | | 3 | | 4 | | 5 | | 6 | | 7 | | 8 | |
|---|---|---|---|---|---|---|---|---|---|---|---|---|---|---|---|---|
| Max. hot draw ratio | 13.4 | | 13.3 | | 11.8 | | 10.8 | | 9.4 | | 8.6 | | 8.2 | | 13.4 | |
| Hot draw ratio | 10.0 | 9.5 | 10.0 | 9.5 | 9.0 | 8.5 | 8.0 | 7.5 | 7.0 | 6.5 | 6.5 | 6.0 | 6.0 | 5.5 | 10.0 | 9.5 |
| Denier (200 filaments) | 1,134 | 1,195 | 1,153 | 1,215 | 1,305 | 1,418 | 1,430 | 1,495 | 1,657 | 1,784 | 1,742 | 1,963 | 1,924 | 2,107 | 1,160 | 1,189 |
| Dry tenacity g./d | 7.83 | 7.42 | 7.43 | 7.02 | 6.58 | 5.96 | 5.83 | 5.28 | 6.58 | 6.47 | 4.55 | 4.17 | 7.37 | 6.82 | 7.33 | 7.26 |
| Dry elongation, percent | 9.2 | 8.7 | 8.2 | 9.2 | 9.0 | 9.5 | 10.2 | 9.6 | 8.8 | 10.1 | 9.2 | 10.3 | 9.3 | 9.8 | 9.6 | 10.2 |
| Wet tenacity, g./d | 5.95 | 5.80 | 5.78 | 5.56 | 4.96 | 4.41 | 3.66 | 3.26 | 4.79 | 4.61 | 2.67 | 2.21 | 5.63 | 5.56 | 5.68 | 5.56 |
| Wet elongation, percent | 10.2 | 12.8 | 11.9 | 12.7 | 12.3 | 12.3 | 11.7 | 11.9 | 12.7 | 12.8 | 11.6 | 10.9 | 12.5 | 12.6 | 12.2 | 12.5 |
| Shrinkage after 60 minutes in 100° C. water, percent | 4.7 | 4.8 | 5.0 | 5.3 | 4.5 | 8.8 | 16.8 | 21.0 | 9.0 | 7.5 | 23.5 | 36.8 | 5.3 | 5.8 | 6.6 | 6.5 |

The results presented above indicate that superior filaments are obtained by maintaining the draft ratio below about 1.0 and preferably below about 0.7. The results further show that stretching the filaments during drying has a deleterious effect on filament properties where the filaments stretched contain 10% or more water (samples 4 and 6). The stretching of samples 5 and 7 which took place late in the drying when the water content was of the order of 3.5 to 4.5% can be considered part of the hot drawing and does not deleteriously affect filament properties to a significant degree. The results indicate that the process conditions should be regulated to give filament tenacities of 1.5 or less and preferably 1.4 or less after drying to obtain filaments having superior properties; most desirably, the process is controlled to give filaments having 1.25–1.35 g./d. tenacity after drying.

EXAMPLE 11

This example illustrates the effect of twist on maximum hot drawability.

Polyvinyl alcohol filaments prepared by the invention, after spinning and drying, were twisted prior to hot drawing. The maximum hot draw ratios to which these twisted filaments could be drawn are compared in the following table with the maximum ratios untwisted filaments could be drawn under the same conditions.

*Table 5*

| Example | Twist, turns per meter | Max. hot draw ratio |
|---|---|---|
| A | 0 | 7.5 |
| A | 100 | 9.0 |
| B | 0 | 8.0 |
| B | 80 | 10.5 |

The results shown above clearly demonstrate the improved hot drawability of polyvinyl alcohol filaments which have been twisted prior to hot drawing over that of similar filaments which were not twisted.

EXAMPLE 12

This example illustrates the effect of twisting before hot drawing on filament breakage at constant hot draw ratio.

The following table shows the percentage of filament packages which were passing as related to the filament twist.

*Table 6*

| Twist, turns per meter | Passing product, percent |
|---|---|
| 30 | 0 |
| 50 | 11 |
| 80 | 76 |
| 100 | 87 |
| 120 | 100 |

These results show that twisting the polyvinyl alcohol filaments a relatively high number of turns per meter, e.g., 80 or more, effectively reduces filament breakage.

EXAMPLE 13

This example illustrates the effect of twist on filament breakage at constant hot draw and heat shrinkage.

Polyvinyl alcohol filaments, after spinning and drying in accordance with this invention, were twisted and subsequently hot drawn to a draw ratio of 9.5 and heat treated whereby 5% shrinkage took place under the same conditions.

After washing, finishing, drying and winding, the filament packages were examined as described in the preceding example. The following table shows the results obtained.

*Table 7*

| Example | Twist, turns per meter | Passing product, percent |
|---|---|---|
| A | 36 | (¹) |
|   | 56 | 11.1 |
|   | 80 | 75.8 |
| B | 80 | 87.5 |
|   | 100 | 86.5 |
|   | 120 | 100 |
|   | 150 | 100 |

¹ Could not draw 9.5.

EXAMPLE 14

Polyvinyl alcohol having a degree of polymerization of about 1719 was conditioned to a moisture content of about 57% as described in Example 1. About 0.2% of magnesium sulfate and 0.075% of lauryl trimethyl ammonium chloride based on the weight of polyvinyl alcohol were added prior to the conditioning.

The conditioned mixture was liquefied in a screwtype extruder and spun at a temperature of 130° C. through a spinning jet having 200 holes each 0.1 mm. in diameter. Air at about 50° C. was introduced cocurrent with the spun filaments to congeal said filaments. The filaments were passed around a take-up roll located about 1–1.3 meters from the jet face. Draft ratio was 0.585.

The filaments were dried in three successive drying zones having temperatures respectively of 103° C., 140° C., and 160° C. Subsequently the filaments were twisted 80 turns per meter, and dried to bone dry at 180° C. During the initial three stages of drying, the filaments elongated 17% of their length.

The filaments were hot drawn at a temperature of 233° C. and then heat treated at 255° C. until 5% shrinkage had taken place. The following table shows the effect of varying the hot draw ratio on the filament properties.

Table 8

| Hot draw ratio | Total denier (100 filaments) | Bone dry | | Wet | | Shrinkage 30 min. 100° C. water, percent |
|---|---|---|---|---|---|---|
| | | Ten., g./d. | Elong., percent | Ten., g./d. | Elong., percent | |
| 6.0 | 1,925 | 4.41 | 13.2 | 2.84 | 18.2 | Dissolved |
| 6.5 | 1,762 | 5.04 | 12.0 | 3.36 | 16.0 | Dissolved |
| 7.0 | 1,652 | 5.25 | 10.3 | 3.64 | 14.2 | Dissolved |
| 7.5 | 1,535 | 5.82 | 10.2 | 4.12 | 13.6 | Dissolved |
| 8.0 | 1,456 | 5.91 | 10.7 | 4.17 | 13.0 | Dissolved |
| 8.5 | 1,350 | 6.32 | 10.2 | 4.66 | 12.4 | 12.0 |
| 9.0 | 1,253 | 6.44 | 8.9 | 5.03 | 11.2 | 8.5 |
| 9.5 | 1,215 | 7.02 | 9.2 | 5.56 | 12.7 | 5.3 |
| 10.0 | 1,153 | 7.43 | 8.2 | 5.78 | 11.9 | 5.0 |
| 10.5 | 1,116 | 7.46 | 9.0 | 5.85 | 11.3 | 5.4 |

EXAMPLE 15

This example illustrates the effect of hot drawing and heat shrinking on creep properties of fibers prepared by the invention.

Polyvinyl alcohol filaments were prepared and dried in accordance with this invention. These filaments were subjected to different hot drawing and heat shrinking ratios and the creep of the resulting filaments was determined in each case. The following table shows the results obtained.

Table 9

| Hot draw, ratio | Heat shrink, percent | Creep, percent |
|---|---|---|
| 9.5 | 5 | 3.40 |
| 9.5 | 3 | 2.70 |
| 9.5 | 0 | 1.40 |
| 10.0 | 7 | 2.65 |
| 10.0 | 5 | 2.50 |
| 10.0 | 3 | 2.30 |
| 10.0 | 0 | 1.10 |
| 10.5 | 7 | 1.80 |
| 10.5 | 5 | 1.60 |
| 10.5 | 3 | 1.50 |
| 10.5 | 0 | 1.00 |
| 11.0 | 7 | 1.40 |
| 11.0 | 5 | 1.35 |
| 11.0 | 3 | 1.25 |
| 11.0 | 0 | 0.55 |

These results show that creep decreases at higher hot draw ratios. The results also show that creep increases with increasing heat shrinkage.

EXAMPLE 16

This example illustrates the effect of increasing the temperature in the hot drawing zone in one or more increments on the maximum hot drawability for fibers prepared by the invention.

Filaments spun and dried in accordance with the present invention were hot drawn in zones having temperatures as indicated in the following table. The maximum hot draw ratio after the same residence time in the hot drawing zones are shown in the following table (Table 10).

From the results shown in Table 10 it is clear that greater hot draw ratios are obtained when the temperature of the hot drawing zone is increased in one or more increments as contrasted with a constant temperature hot drawing zone.

Table 10

| | Temperature, ° C. | | | Maximum hot draw |
|---|---|---|---|---|
| | $T_1$ | $T_2$ | $T_3$ | |
| Example A | 210 | 210 | | 8.5 |
| | 215 | 215 | | 9.0 |
| | 220 | 220 | | 9.0 |
| | 225 | 225 | | Break |
| | 220 | 225 | | 9.5 |
| | 220 | 230 | | 10.5 |
| | 220 | 235 | | 9.0 |
| | 215 | 225 | | 10.5 |
| | 215 | 230 | | 10.5 |
| | 215 | 235 | | 11.0 |
| | 210 | 220 | | 9.5 |
| | 210 | 225 | | 10.5 |
| | 210 | 230 | | 10.5 |
| | 210 | 235 | | 11.0 |
| | 205 | 225 | | 10.0 |
| | 205 | 230 | | 10.5 |
| | 205 | 235 | | Break |
| Example B | 210 | 213 | 233 | 11.1 |
| | 210 | 218 | 233 | 11.6 |
| | 210 | 223 | 233 | 12.0 |
| | 210 | 228 | 233 | 12.0 |
| | 210 | 233 | 233 | 11.8 |
| | 200 | 233 | 233 | 11.5 |
| | 205 | 233 | 233 | 11.6 |
| | 215 | 233 | 233 | 11.0 |
| | 220 | 233 | 233 | 11.0 |
| | 225 | 233 | 233 | Break |

EXAMPLE 17

This example illustrates the importance of drying the filaments as completely as possible prior to hot drawing in order to avoid filament breakage.

Polyvinyl alcohol filaments prepared by the invention were dried to varying moisture contents. The samples were drawn to the same hot draw ratio and heat treated in a similar manner. After washing, finishing, drying, and winding, the filament packages were examined as described in Example 13 to determine passing percentage. The following table shows the results obtained.

Table 11

| | Filament water content, percent | Passing percentage |
|---|---|---|
| Example A | 1.14 | 76.5 |
| | 0.47 | 87 |
| | 0.2 | 100 |
| Example B | 0.4 | 87.2 |
| | 0.0 | 94.5 |

These results show that less breakage occurs at lower water content of the filament prior to hot drawing.

EXAMPLE 18

This example illustrates the effect of varying the temperature in the heat shrinking and setting bath in one or more increments on filament breakage.

Filaments prepared by the invention and drawn to the same hot draw ratio were treated for the same time in heat shrinking and setting baths having temperatures which varied in one or more increments. The results are shown in the following table.

Table 12

| Temperature, °C. | | | Breakage, percent | Dry ten., g./d. | Dry elong., percent | Wet ten., g./d. |
| --- | --- | --- | --- | --- | --- | --- |
| $T_1$ | $T_2$ | $T_3$ | | | | |
| 220 | 230 | 235 | 10 | 6.88 | 8.8 | 5.43 |
| 225 | 230 | 235 | 10 | 6.86 | 8.7 | 5.45 |
| 230 | 235 | 235 | 64.4 | 6.89 | 8.8 | 5.34 |
| 235 | 235 | 235 | 96.7 | 6.24 | 8.5 | 4.76 |

The results show clearly the advantages of employing a heat shrinking and setting zone having temperature which increases in one or more increments.

EXAMPLE 19

Polyvinyl alcohol having an average degree of polymerization of 1730 was spun into a 10,250 denier 200 filament yarn by the process of this invention. The fibers were hot-stretched in a bath having 210° C. inlet temperature, 225° C. intermediate temperature and 233° C. exit temperature. Maximum hot draw ratio was 11.5. The drawn fibers were heat treated in a bath having an inlet temperature of 220° C., an intermediate temperature of 227° C., and 235° C. exit temperature. Strength of the product fibers was 8.1 g./d. and no fiber breakage was noticeable.

By way of contrast, where the heat treating bath temperature did not vary, the maximum hot draw ratio was 9 and the product fibers had a strength of 6.6 g./d.

EXAMPLE 20

Polyvinyl alcohol having an average degree of polymerization of 1650 was spun into a 3100 denier monofilament by the process of the invention. The filament was hot-stretched in a bath having an inlet temperature of 210° C., an intermediate temperature of 220° C. and an exit temperature of 227° C. to a hot draw ratio of 9.3. The filament was heat treated in a bath having temperatures continuously varying from 225° C. at the inlet to 233° C. at the exit. The filament underwent 23% shrinkage. The resulting filament had a wet tenacity of 4.8 g./d. and a wet elongation of 27.9%.

By way of contrast, where uniform temperature treating baths were used, the thermal contraction was irregular resulting in gnarled filaments which were not commercially useful.

EXAMPLE 21

Polyvinyl alcohol having an average degree of polymerization of 1720 was admixed with water and liquefied as described in Example 1. The liquefied mixture was extruded through a spinneret having 0.1 mm. diameter holes. Air at 60° C. was introduced into the spinning zone. Filament draft was 0.63. The filaments were dried to bone dry, heat stretched 10.5 times at 233° C., and heat shrunk 5% at 235° C. The resulting filaments were water washed and oiled. The product filaments had 7.5 g./d. dry tenacity, 7.9% dry elongation, and shrunk 6.2% when immersed 30 minutes in boiling water.

EXAMPLE 22

Polyvinyl alcohol having an average degree of polymerization of 1680 was admixed with water to form a mixture comprising 45% polyvinyl alcohol. The mixture was liquefied and extruded through a spinneret having 0.1 mm. diameter holes into air as described in Example 1. Draft was 0.68. The resulting filaments were dried at 103° C. to 5% moisture content and then heated to 140° C. and stretched to 1.75 times the original length. The stretched filaments were dried to bone dry and to 6 times their length at 230° C. The filaments were heat set at constant length at 235° C. and washed and oiled. Product filaments were obtained having a dry tenacity of 7.37 g./d., dry elongation of 9.3% and shrinkage of 5.3% in boiling water for 30 minutes.

EXAMPLE 23

Polyvinyl alcohol having an average degree of polymerization of 1760 was liquefied as described in Example 1. The liquid was spun as described in Example 22. Draft was 0.53. The filaments were dried in driers at 103° C., 140° C., and 160° C. Stretching during drying was 17%, the dried filaments had a tenacity of 1.28 g./d. The filaments were twisted 80 turns per meter and dried at 180° C. to 0.15% moisture. The filaments were heat stretched to 10.5 times their length in a Wood's metal bath having an inlet temperature of 210° C., an intermediate temperature of 233° C., and an outlet temperature of 233° C. The stretched filaments were shrunk 3% in a Wood's metal bath having 225° C. inlet, 230° C., intermediate, and 235° C. exit temperature. The resulting filaments had 1180 denier for 200 filaments, dry tenacity of 8.87 g./denier, 8.9% dry elongation and 7% shrinkage in boiling water at 100° C. for 30 minutes.

EXAMPLE 24

Filaments were prepared similarly as described in Example 23 except the shrinkage was varied. The following table shows the effects of shrinkage on filament properties.

Table 13

| Heat stretch | Heat shrink, percent | Denier, d. | Dry tenacity, g./d. | Dry elongation, percent | Shrinkage in 100° C. water 30 minutes, percent | Creep elongation, percent |
| --- | --- | --- | --- | --- | --- | --- |
| 10.5 | 0 | 1,219 | 7.52 | 7.6 | 7.8 | 1.74 |
| 10.5 | 3 | 1,206 | 7.99 | 8.4 | 6.3 | 1.85 |
| 10.5 | 5 | 1,190 | 8.00 | 7.8 | 5.5 | 2.28 |

EXAMPLE 25

This example relates to the use of different finishing agents and the effect of these agents on the properties of filaments and tire cords prepared by the invention.

Table 14

| Sample number | 1 | 2 | 3 | 4 | 5 | 6 |
| --- | --- | --- | --- | --- | --- | --- |
| Description, denier/number of filaments | 1,200/200 | 1,200/200 | 1,200/200 | 1,200/200 | 1,200/200 | 1,200/200 |
| Finishing agent | A | B | C | 70% A, 30% B | 30% A, 70% B | D |
| Finishing agent, absorption at percent of filaments | 1.08 | 1.25 | 0.95 | 0.76 | 0.80 | 1.15 |
| Denier | 1,233 | 1,218 | 1,219 | 1,218 | 1,217 | 1,209 |
| Tensile strength, kg | 6.25 | 6.77 | 6.51 | 6.78 | 6.76 | 6.86 |
| Dry tenacity, g./d | 5.07 | 5.56 | 5.34 | 5.57 | 5.55 | 5.68 |
| Dry elongation, percent | 8.9 | 9.0 | 9.0 | 9.6 | 9.0 | 8.3 |

NOTE.—A is Span 40, sorbitan monopalmitate; B is Nopco 2169-M, a mixture of alkyl benzene sulfonate and paraffin; C is Atlas G 1295, polyoxyethylene fatty glyceride; D is white oil.

The above filaments were made into tire cords by conventional techniques. The following table shows the tire cord properties.

Table 15

| Sample number | 1 | 2 | 3 | 4 | 5 | 6 |
|---|---|---|---|---|---|---|
| Cord construction, denier/ply | 1,200/2 | 1,200/2 | 1,200/2 | 1,200/2 | 1,200/2 | 1,200/2 |
| Ply twist, turns/inch | 13.76 | 14.00 | 13.84 | 13.55 | 13.90 | 13.84 |
| Cord twist, turns/inch | 14.26 | 14.06 | 14.32 | 13.82 | 14.22 | 14.07 |
| Size, denier | 2,772 | 2,809 | 2,777 | 2,700 | 2,797 | 2,714 |
| Tensile strength, kg | 10.09 | 10.04 | 9.99 | 11.31 | 10.63 | 10.46 |
| Elongation at 4.5 kg. load, percent | 7.69 | 8.80 | 8.98 | 7.64 | 9.33 | 6.89 |
| Breaking elongation, percent | 18.79 | 18.69 | 18.79 | 19.02 | 20.46 | 15.71 |
| Fatigue resistance (rayon=100) | 61 | 176 | 43 | 119 | 104 | 50 |

These results show that the finishing agents have an effect on filaments and cords made from the filaments. The alkyl benzene sulfonate-paraffin mixture (Nopco 2169 M) used to finish sample 2 gave outstanding results.

EXAMPLE 26

This example shows the effects of different amounts of finishing agent on the properties of filaments and tire cords prepared by the invention.

Table 17

| Sample number | 1 | 2 | 3 | 4 | 5 | 6 |
|---|---|---|---|---|---|---|
| Cord construction, denier/ply | 1,200/2 | 1,200/2 | 1,200/2 | 1,200/2 | 1,200/2 | 1,200/2 |
| Ply twist, turns/inch | 13.81 | 13.92 | 13.69 | 13.78 | 13.88 | 14.06 |
| Cord twist, turns/inch | 14.13 | 14.26 | 14.10 | 14.59 | 14.22 | 14.27 |
| Size, denier | 2,782 | 2,752 | 2,711 | 2,719 | 2,759 | 2,710 |
| Tensile strength, kg | 10.99 | 11.55 | 11.04 | 10.82 | 11.43 | 10.36 |
| Elongation at 4.5 kg. load, percent | 8.24 | 8.19 | 8.52 | 8.42 | 8.01 | 8.42 |
| Breaking elongation, percent | 18.54 | 18.74 | 18.81 | 18.57 | 18.84 | 18.59 |
| Fatigue resistance (Rayon=100) | 113 | 149 | 167 | 189 | 165 | 77 |

EXAMPLE 27

Polyvinyl alcohol filaments were prepared by the invention in a manner similar to that described in Example 1. The amount of hot drawing and heat shrinkage was varied. The following table shows the effect of different Table 16

| Sample Number | 1 | 2 | 3 | 4 | 5 | 6 |
|---|---|---|---|---|---|---|
| Description, denier/number of filaments | 1,200/200 | 1,200/200 | 1,200/200 | 1,200/200 | 1,200/200 | 1,200/200 |
| Finishing agent | B | B | B | E | E | E |
| Finishing agent, absorption weight percent of filaments | 0.38 | 1.31 | 2.52 | 0.46 | 1.11 | 2.38 |
| Denier | 1,210 | 1,211 | 1,218 | 1,198 | 1,205 | 1,209 |
| Tensile strength, kg | 6.90 | 7.10 | 6.77 | 6.76 | 7.00 | 6.61 |
| Dry tenacity, g./d | 5.70 | 5.86 | 5.56 | 5.65 | 5.80 | 5.48 |
| Dry elongation, percent | 8.5 | 8.1 | 8.1 | 7.9 | 8.4 | 8.5 |

NOTE.—B is Nopco 2169-M, a mixture of alkyl benzene sulfonate and paraffin; E is Nopco 1409-M, a mixture of alkyl benzene sulfonate and paraffin.

The above filaments were made into tire cords by conventional techniques. The following table shows the tire cord properties.

hot drawing and heat shrinkage on filament properties and on the properties of tire cords prepared therefrom:

Table 18

| Sample No. | Hot draw ratio | Heat shrink, percent | Filament | | | | | Cord | | | | | |
|---|---|---|---|---|---|---|---|---|---|---|---|---|---|
| | | | Dry tenacity, g./d. | Dry elongation, percent | Wet tenacity, g./d. | Wet elongation, percent | Shrinkage in boiling water, percent | Denier | Tensile strength, kg. | Dry tenacity, g./d. | Elongation 4.5 kg. load, percent | Breaking elongation, percent | Tenacity utility ratio, percent |
| 1 | 9.5 | 0 | 6.94 | 8.3 | 5.47 | 11.1 | 10.0 | 2,589 | 12.32 | 4.76 | 5.0 | 12.0 | 78 |
| 2 | 9.5 | 3 | 6.75 | 7.7 | 5.51 | 11.8 | 9.5 | 2,686 | 12.34 | 4.59 | 5.3 | 13.2 | 78 |
| 3 | 9.5 | 5 | 6.91 | 9.2 | 5.54 | 12.0 | 8.5 | 2,766 | 12.64 | 4.57 | 6.2 | 15.6 | 77 |
| 4 | 10.0 | 0 | 7.42 | 8.1 | 5.87 | 9.7 | 11.0 | 2,653 | 13.42 | 5.06 | 5.0 | 12.5 | 79 |
| 5 | 10.0 | 3 | 7.26 | 8.9 | 5.98 | 10.5 | 8.0 | 2,793 | 13.25 | 4.74 | 5.0 | 13.1 | 76 |
| 6 | 10.0 | 5 | 7.12 | 7.8 | 5.80 | 12.3 | 7.3 | 2,716 | 13.51 | 4.97 | 5.8 | 14.6 | 79 |
| 7 | 10.0 | 7 | 7.40 | 9.1 | 5.66 | 12.8 | 6.8 | 2,820 | 13.53 | 4.80 | 6.6 | 16.6 | 75 |
| 8 | 10.0 | 10 | 6.86 | 10.4 | 5.71 | 14.7 | 5.3 | 2,893 | 13.30 | 4.59 | 6.5 | 16.8 | 76 |
| 9 | 10.5 | 0 | 7.70 | 7.7 | 5.76 | 9.0 | 8.0 | 2,615 | 13.01 | 4.97 | 4.9 | 11.7 | 74 |
| 10 | 10.5 | 3 | 7.63 | 7.3 | 5.97 | 9.9 | 6.8 | 2,775 | 12.96 | 4.67 | 5.2 | 12.6 | 74 |
| 11 | 10.5 | 5 | 7.50 | 7.9 | 6.02 | 10.3 | 6.0 | 2,759 | 13.59 | 4.93 | 5.4 | 13.6 | 77 |
| 12 | 10.5 | 7 | 7.60 | 8.8 | 6.11 | 11.0 | 6.0 | 2,830 | 14.15 | 5.09 | 5.6 | 15.0 | 77 |
| 13 | 11.0 | 0 | 7.17 | 6.7 | 5.40 | 8.5 | 7.5 | 2,490 | 13.03 | 5.24 | 4.4 | 11.0 | 83 |
| 14 | 11.0 | 3 | 7.48 | 7.7 | 5.72 | 9.2 | 6.0 | 2,550 | 12.88 | 5.05 | 5.0 | 12.2 | 74 |
| 15 | 11.0 | 5 | 7.64 | 7.1 | 5.79 | 10.1 | 5.8 | 2,560 | 13.43 | 5.25 | 5.1 | 13.0 | 78 |
| 16 | 11.0 | 7 | 7.75 | 9.8 | 6.07 | 11.5 | 5.0 | 2,717 | 13.73 | 5.05 | 6.4 | 15.8 | 74 |
| 17 | 11.0 | 10 | 7.46 | 10.1 | 6.01 | 13.0 | 5.3 | 2,808 | 14.71 | 5.24 | 5.8 | 17.0 | 81 |

EXAMPLE 28

This example illustrates the advantageous effects derived from heat treating tire cords prepared by the invention. In each case, the tire cords were formed by known techniques from polyvinyl alcohol fibers prepared by the invention.

Table 19

| Cord treatment conditions | Product properties | | |
|---|---|---|---|
| | Dry tenacity, g./d. | Dry elongation, percent | Tenacity utility ratio, percent |
| Not treated | 4.67 | 14.5 | 100 |
| Heated in relaxed state 20 seconds at— | | | |
| 100° C | 4.65 | 14.2 | 100 |
| 150° C | 4.72 | 14.7 | 101 |
| 200° C | 4.77 | 14.7 | 102 |
| 230° C | 4.89 | 15.7 | 105 |
| 240° C | 5.14 | 15.7 | 110 |
| 250° C | Cords deteriorate and gelatinize | | |
| Heated at 230° C. in relaxed state for— | | | |
| 3 seconds | 4.39 | 15.8 | 94 |
| 10 seconds | 4.45 | 14.6 | 95 |
| 30 seconds | 5.03 | 15.6 | 108 |
| 50 seconds | 4.83 | 19.9 | 103 |
| Heated at 240° C. in relaxed state for— | | | |
| 3 seconds | 4.33 | 14.5 | 93 |
| 10 seconds | 4.47 | 16.0 | 96 |
| 30 seconds | 5.14 | 15.0 | 110 |
| 50 seconds | 4.17 | 14.7 | 89 |

From the results given above, it can be seen that heat treating the tire cords at temperatures in the range of about 220° C.–240° C. for moderate times of about 20–30 seconds significantly improves the tire cord properties.

EXAMPLE 29

This example illustrates advantageous effects derived from hot drawing and heat shrinking polyvinyl alcohol tire cords prepared by the invention. In each case, the tire cords were formed by known methods from polyvinyl alcohol fibers prepared by the invention.

Table 20

| Cord treatment | Product properties | | |
|---|---|---|---|
| | Dry tenacity, g./d. | Dry elongation, percent | Tenacity utility ratio, percent |
| Not treated | 4.70 | 13.4 | 100 |
| Just heat treated | 5.14 | 13.0 | 109 |
| Hot drawn 10% in 33 seconds at 235° C | 5.35 | 10.9 | 114 |
| Hot drawn 20% in 33 seconds at 235° C | 5.92 | 10.0 | 126 |
| Hot drawn 30% in 33 seconds at 235° C | 6.48 | 9.2 | 138 |
| Hot drawn 40% in 33 seconds at 235° C | 7.03 | 8.4 | 149 |
| Hot drawn 50% in 33 seconds at 235° C | 7.47 | 9.2 | 159 |
| Hot drawn 60% in 33 seconds at 235° C | Broken | | |
| Hot drawn 5% in 33 seconds at 235° C., heat shrunk 4.8% in 30 seconds at 235° C | 5.34 | 13.1 | 102 |
| Hot drawn 10% in 33 seconds at 235° C., heat shrunk 9.1% in 30 seconds at 235° C | 6.05 | 14.4 | 115 |
| Hot drawn 15% in 33 seconds at 235° C., heat shrunk 13.0% in 30 seconds at 235° C | 6.30 | 16.7 | 120 |

These results show that the tire cord strength is greatly improved by hot-stretching the cord up to about 50%. Both improved strength and elasticity result from hot drawing the cord and subsequently heat shrinking the drawn cord.

We claim:

1. The method of producing polyvinyl alcohol fibers characterized by high strength and fatigue resistance and a substantially circular cross-sectional configuration having no distinct skin and core sections which comprises forming a liquid polyvinyl alcohol and water spinning mixture having a polyvinyl alcohol concentration in the range 30–65% by weight, extruding said mixture through small spinning jet holes while regulating the spinning temperature, the polyvinyl alcohol concentration and the spinning hole size to avoid bubble formation in the mixture, rapidly congealing the extruded liquid to form filaments, drying the filaments while substantially avoiding stretching of said filaments until the water content thereof is reduced to below about 10% by weight to produce filaments having a tenacity not exceeding 1.5 g./d., hot drawing the filaments to a length 5 to 15 times the length before drying and heat setting the filaments with 0–20% shrinkage.

2. The method of producing polyvinyl alcohol fibers characterized by high strength and fatigue resistance and a substantially circular cross-sectional configuration having no distinct skin and core sections which comprises forming a solid polyvinyl alcohol-water spinning mixture containing 30–65% by weight polyvinyl alcohol, kneading the said mixture at a temperature of 50–85° C. to increase the bulk density thereof, crushing the kneaded mixture to fine particle size, liquefying the said fine particles in a screw extruder at a temperature in the range 110° C.–160° C. and at a pressure of 5–120 kg./cm.², extruding the liquid polyvinyl alcohol and water into a gaseous medium through small spinning jet holes at a temperature of at least 100° C., rapidly congealing the extruded liquid to form filaments, collecting the congealed filaments at a draft ratio of 0.3 to 1.0, drying the filaments to a water content below about 10% by weight while substantially avoiding stretching of the said filaments to produce filaments having a tenacity not greater than 1.5 g./d., substantially completely drying the filaments, hot drawing the filaments at temperatures from 210° C., to below the melting point to a length 5 to 15 times the length before drying, and heat setting the filaments with 0–20% shrinkage.

3. In a process for producing polyvinyl alcohol fibers characterized by high strength and fatigue resistance and a substantially circular cross-sectional configuration having no distinct skin and core sections involving the step of hot drawing polyvinyl alcohol fibers, the improvement which comprises initially heating the fibers to at least 210° C., and subsequently increasing the fiber temperature in a range up to but short of the melting point of said fibers during the hot drawing.

4. In a process for producing polyvinyl alcohol fibers characterized by high strength and fatigue resistance and a substantially circular cross-sectional configuration having no distinct skin and core sections involving the step of heat setting polyvinyl alcohol fibers, the improvement which comprises initially heating the fibers to at least about 215° C., and subsequently increasing the fiber temperature up to about 250° C. during the heat treatment.

5. An improved polyvinyl alcohol fiber prepared by the method of claim 1 and characterized by a substantially round, homogeneous cross-section with no distinct skin and core sections, high strength and elongation, shrinkage in boiling water of less than 10%, and high flex strength and fatigue resistance.

6. The method of forming polyvinyl alcohol shaped articles free of bubbles and characterized by high strength and fatigue resistance and a substantially circular cross-sectional configuration having no distinct skin and core sections which comprises extruding at a temperature of at least 120° C. a liquid polyvinyl alcohol-water mixture containing 30–65% by weight of polyvinyl alcohol through an aperture having a cross-sectional dimension of not more than 0.3 mm., rapidly congealing the extruded material to form shaped articles therefrom, drying said articles while substantially avoiding stretching of the articles until the water content thereof is reduced to below about 10% by weight, and subsequently hot drawing the articles to a length of at least about 5 times the length before drying, and heat setting said articles.

References Cited in the file of this patent

UNITED STATES PATENTS

| | | |
|---|---|---|
| 2,072,302 | Herrmann et al. | Mar. 2, 1937 |
| 2,146,295 | Herrmann et al. | Feb. 7, 1939 |
| 2,610,359 | Hatchard | Sept. 16, 1952 |
| 2,610,360 | Cline | Sept. 16, 1952 |
| 2,668,785 | Jefferson | Feb. 9, 1954 |
| 2,794,700 | Cheney | June 4, 1957 |
| 2,820,019 | Eustance | Jan. 14, 1958 |
| 2,869,972 | Head | Jan. 20, 1959 |
| 2,870,113 | Jones | Jan. 20, 1959 |
| 2,890,927 | Suyama | June 16, 1959 |
| 2,895,786 | Schlack | July 21, 1959 |

OTHER REFERENCES

Ser. No. 343,168, Sakurada (A.P.C.), published Apr. 27, 1943.

Encyclopedia of Surface-Active Agents, Sisley and Wood (published by Chemical Publishing Co., Inc., New York, 1952).